(No Model.) 3 Sheets—Sheet 2.
C. DORIOT.
DENTAL ENGINE.
No. 504,491. Patented Sept. 5, 1893.
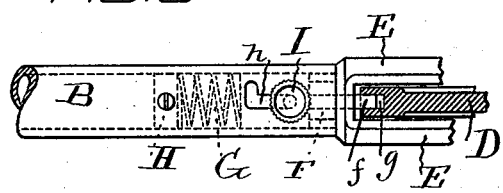
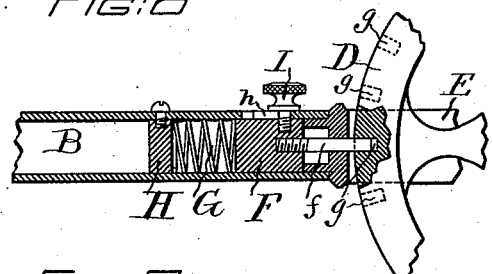
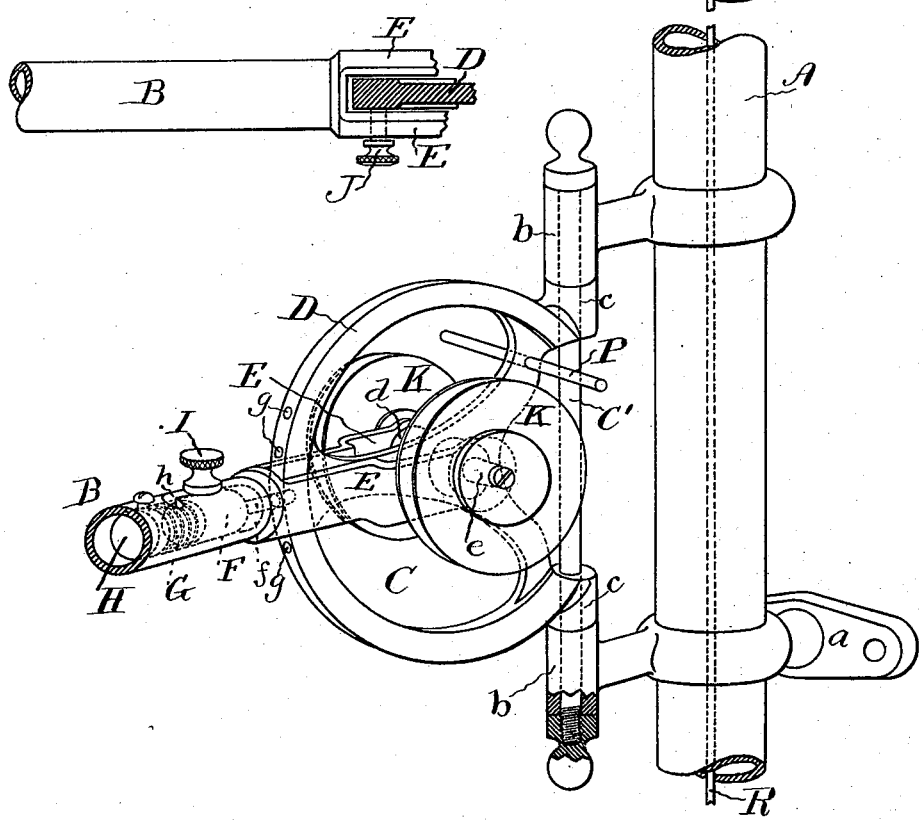
WITNESSES:
Edw. F. Simpson, Jr.
W. H. Beall
INVENTOR:
Constant Doriot
By J. R. Peyton
ATT'Y.

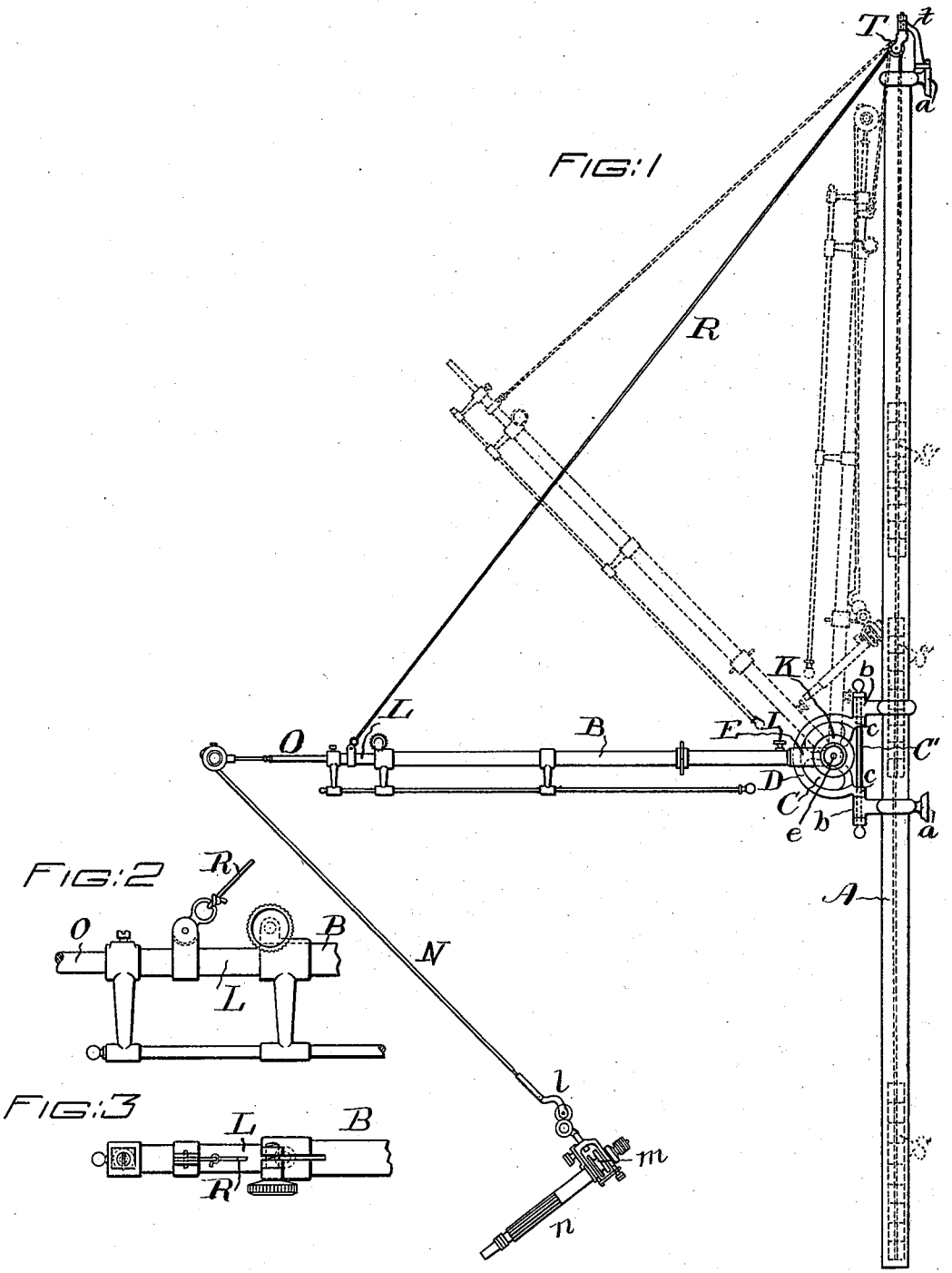

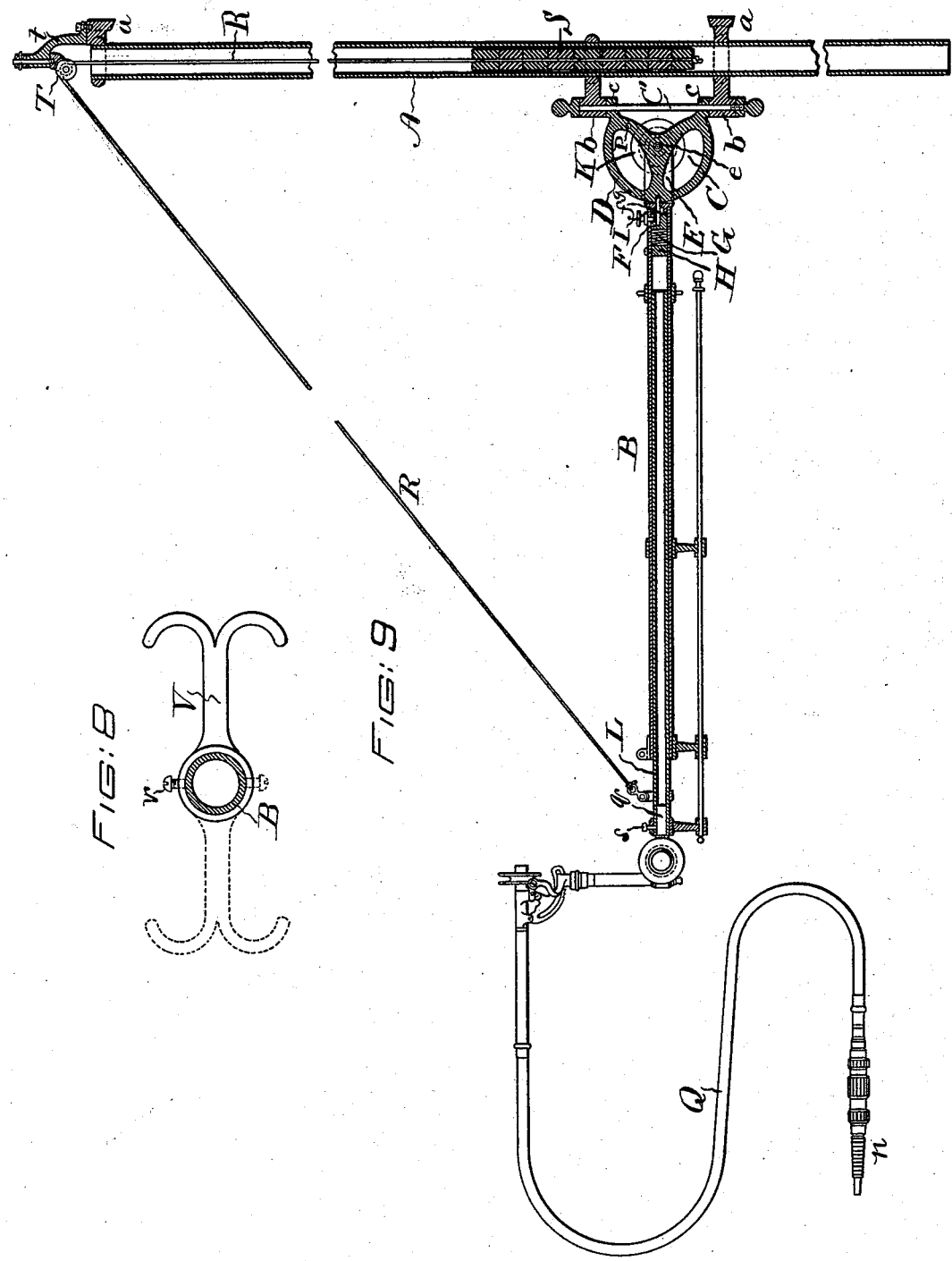

UNITED STATES PATENT OFFICE.

CONSTANT DORIOT, OF PHILADELPHIA, PENNSYLVANIA, ASSIGNOR TO THE S. S. WHITE DENTAL MANUFACTURING COMPANY, OF SAME PLACE.

DENTAL ENGINE.

SPECIFICATION forming part of Letters Patent No. 504,491, dated September 5, 1893.

Application filed March 13, 1893. Serial No. 465,772. (No model.)

*To all whom it may concern:*

Be it known that I, CONSTANT DORIOT, a citizen of the Republic of France, residing in Philadelphia, in the county of Philadelphia, in the State of Pennsylvania, have invented certain new and useful Improvements in Dental Engines, of which the following is a specification.

My invention relates to certain improvements applicable to dental engines of the class provided with brackets for attachment to walls, window frames, &c.

In the accompanying drawings, which show a suitable organization of my improvements, Figure 1 is a view partly in elevation and partly in section of the complete apparatus. Figs. 2 and 3 show respectively an elevation and a plan view of a portion of the rocking and swinging telescoping bracket arm, and attachments thereof, on an enlarged scale. Fig. 4 is a view in perspective, on a still larger scale, showing the tubular bracket support and parts connected therewith. Fig. 5 is a view partly in plan and partly in section showing portions of the bracket arm and means for locking it against vertical movement. Fig. 6 is a view of the same parts partly in elevation and partly in vertical central section. Fig. 7 is a view partly in plan and partly in section, showing a modified way of locking the bracket arm against vertical movement. Fig. 8 is a view in elevation of the support for the outer end of the engine arm when not in use. Fig. 9 is a view similar to Fig. 1, with the exception that a sheathed flexible shaft is substituted for the jointed engine arm.

A tubular bracket support A is adapted to be attached to a wall, &c., by wall plates $a\ a$ rigid with the support fastened in place by screws.

The inner or main section B of a telescoping bracket arm has jointed connection with the fixed bracket support in such manner as to have horizontally swinging and vertically rocking movements.

As shown the connection between the bracket arm and its support is as follows:—Short arms rigid with the support are provided with bearing sleeves $b\ b$, and a swinging carrier C for the bracket arm is connected with the bearing sleeves by means of a pivot rod or pintle $C'$ which passes through them and through bearings $c\ c$ of the carrier. The bracket arm carrier is provided with a hub-like bearing sleeve $d$ and an outer segmental portion or sector D concentric with its sleeve. The bracket arm section B is provided at its inner end with forks E E which pass on opposite sides of the carrier sector and are pivoted, adjacent to the opposite ends of the carrier sleeve $d$, to a shaft $e$ which is removably secured in this sleeve in suitable way, as by a set screw.

From the above description it will be seen that the bracket arm is adapted to be swung horizontally and rocked vertically. In order to hold the bracket arm against vertical movement I provide locking devices as follows:— Within the bracket arm section B at its inner end is a slide block F carrying a pin $f$ adapted to engage with detent notches or holes $g$ in the periphery of the carrier sector D. Any desired number of these holes may be provided, to hold the bracket arm in horizontal or inclined position, or but one detent hole may be provided, so as to hold the arm only in the horizontal position in which it is shown in the drawings. A spring G bearing at one end on the slide block F, and at its other end against a disk H secured by a screw in the bracket arm section, acts to force the locking pin $f$ outward and to hold it engaged with the carrier sector. A screw threaded headed pin or button I engages the spring-actuated slide block and works in a slot $h$. This slot is angular, being extended at its outer end at a right angle with its main portion. See Fig. 5. It will be seen that the button I may be actuated to compress the spring to release the locking pin from the sector, and that the button may be locked in the laterally extended end of the slot.

In lieu of the above described locking means for preventing vertical movement of the bracket arm other means may be employed, as, for instance, a set screw J passing through one of the forks of the arm for engaging the side of the carrier sector, as shown in Fig. 7.

Guide pulleys K K for the usually employed driving cord are mounted to rotate about the shaft $e$ to which the bracket arm is pivoted, and as will readily be understood, the driving cord, to which motion is imparted by suitable means passes about other guide pulleys having supporting connection with the outer or sliding section L of the bracket arm, then about pulleys on the wrist joint section $l$ of the engine arm and about the pulley $m$ on the ordinarily employed rotary spindle of the hand piece $n$. The wrist joint section has suitable swiveling connection with the main section N of the engine arm and this main section has swiveling connection with a rod O connecting with the outer end of the telescoping bracket arm, the rod being fitted in the bracket arm and secured, as usual. A pin P secured to the bracket arm carrier serves as a cord guard to prevent the driving cord from being disengaged from the pulleys K K when the engine arm is rocked upward.

Instead of the engine arm an ordinary sheathed flexible shaft Q and its connections may be employed, the standard connecting arm $q$ of the flexible shaft being secured in the outer end of the bracket arm by the set screw $s$ in place of the connecting rod O of the engine arm. An adjustable holder V for hanging the engine arm or flexible shaft when not in use is secured to the main section of the bracket arm by a set screw $v$. A cord R connected with the bracket arm (the outer section thereof) near its outer end, passes about a pulley T over the upper end of the tubular bracket support. This pulley is mounted to swivel in a bracket $t$ rigidly secured to the fixed bracket support by way of its upper wall plate $a$. The cord passes from this swiveling pulley down into the bracket support, and is weighted to counterbalance the weight of the bracket arm, the engine arm (or flexible shaft and connections) and hand-piece. The bracket arm carrier and its locking connection are in this way relieved of considerable strain. The weight S attached to the cord is made up in sections, a number of round blocks fitting loosely in the bracket support being strung upon the cord. In this way by the addition or removal of sections provision is made for counterbalancing more or less weight carried by the bracket arm, as for instance when a flexible shaft and its attachments are substituted for the jointed engine arm, and vice versa. It will be seen that the bracket arm is free to swing horizontally without being interfered with by the weighted counterbalancing cord; that it may be held horizontally or at any desired inclination to raise or lower the outer end of the bracket arm; that when the engine is not in use the bracket arm, engine arm, &c., may be folded up to the bracket support (see dotted lines Fig. 1) and held there, out of the way, by the weighted cord; and that the weight sections are entirely concealed and do not therefore detract from the appearance of the engine.

I claim as my invention—

1. The combination, in a dental engine, of the bracket support, the horizontally swinging carrier having pivotal connection with the bracket support and provided with the sector, the vertically rocking bracket arm having pivotal connection with the carrier, and means for engaging the bracket arm and carrier sector to positively lock the bracket arm against vertical movement, substantially as set forth.

2. The combination, in a dental engine, of the bracket support, the horizontally swinging carrier sector pivoted to said support and having one or more peripheral holes or notches, the tubular bracket arm pivotally connected with the carrier sector and provided with the angular slot, the sliding pin in the bracket arm for engaging the carrier sector, the spring acting on said pin, and the button working in the slot of the bracket arm and serving to actuate the sliding pin and lock it in inoperative position, substantially as set forth.

In testimony whereof I have hereunto subscribed my name.

CONSTANT DORIOT.

Witnesses:
 JULES M. RAVEL,
 HARRY R. BARBER.